(12) United States Patent
Jallot et al.

(10) Patent No.: US 6,364,239 B1
(45) Date of Patent: Apr. 2, 2002

(54) SEAT BELT RETRACTOR WITH ADJUSTABLE TIP GAP

(75) Inventors: Frederick Jallot, Rotherhithe; Paul Slack; John Hodgson, both of Carlisle, all of (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/458,256

(22) Filed: Dec. 9, 1999

(30) Foreign Application Priority Data

Apr. 21, 1999 (GB) ............................................. 9908976

(51) Int. Cl.[7] ............................................. B60R 22/40
(52) U.S. Cl. ................ 242/384.4; 242/384; 242/384.2; 242/384.6
(58) Field of Search ............................... 242/384.4, 384, 242/384.2, 384.6, 384.5; 280/806; 297/478

(56) References Cited

U.S. PATENT DOCUMENTS

| | | | | |
|---|---|---|---|---|
| 4,522,350 A | * | 6/1985 | Ernst | 242/384.2 X |
| 4,736,902 A | * | 4/1988 | Doty | 242/384.2 |
| 5,390,874 A | * | 2/1995 | Lane, Jr. | 242/384.6 |
| 5,624,087 A | * | 4/1997 | Dick et al. | 242/384.2 X |
| 6,299,093 B1 | * | 10/2001 | Harte et al. | 242/384.4 |

* cited by examiner

Primary Examiner—Michael R. Mansen
Assistant Examiner—Minh-Chau Pham
(74) Attorney, Agent, or Firm—Lonnie Drayer; Jarett Rieger

(57) ABSTRACT

A seat belt retractor has a frame, a spool rotatably mounted to the frame, a spool locking device for preventing rotation of the spool. An actuator actuates the spool locking device and has a support carrying an inertia mass and a pawl. The inertia mass is designed to move from an initial position to an actuating position to bring the pawl into engagement with a ratchet on the spool. Engagement of the pawl with the ratchet actuates the spool locking device. The support is arranged to pivot so as to adjust the distance between the pawl and the ratchet. In that way the position of the pawl can be adjusted to provide an optimum gap between the pawl tip and the ratchet on the spool.

9 Claims, 4 Drawing Sheets

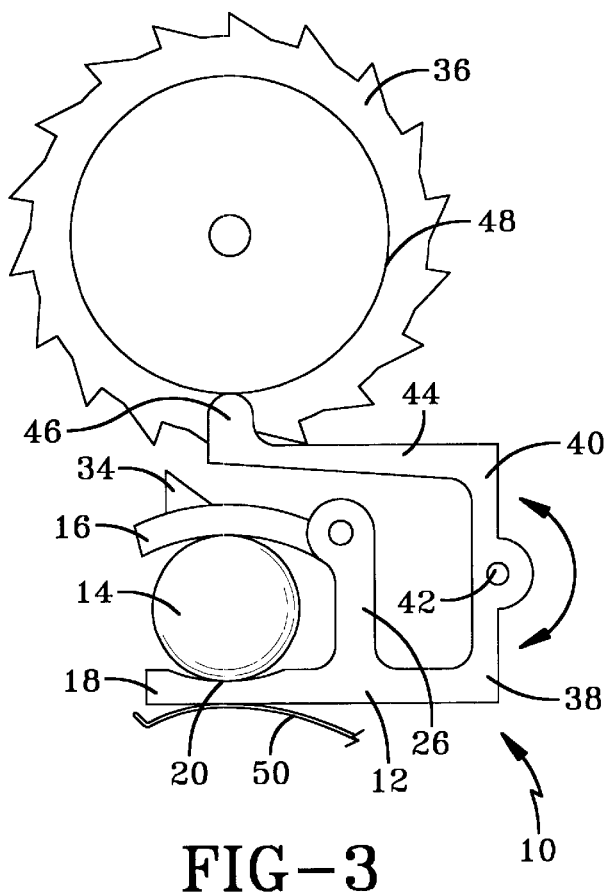
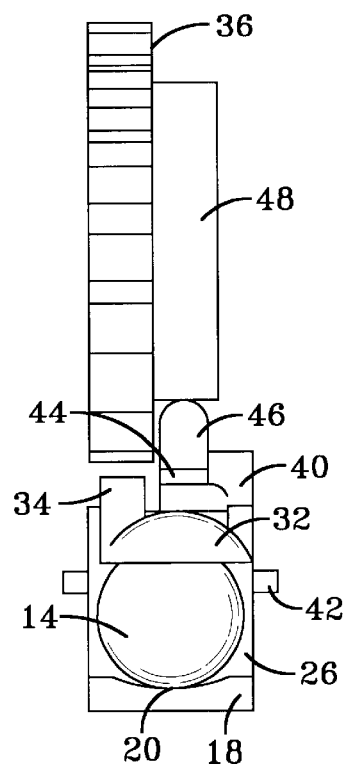
FIG-3    FIG-4
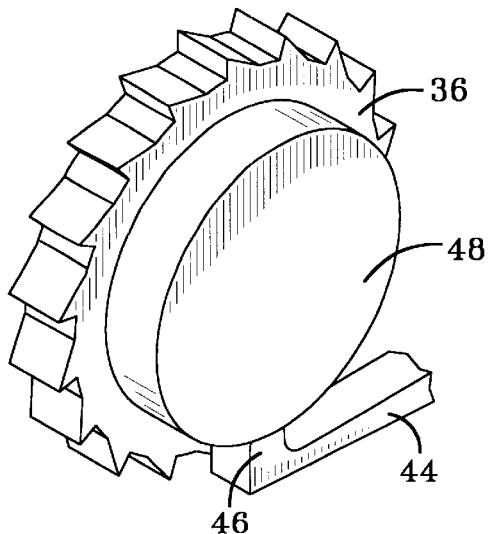
FIG-5

SEAT BELT RETRACTOR WITH ADJUSTABLE TIP GAP

FIELD OF THE INVENTION

The invention relates to a seat belt retractor.

BACKGROUND OF THE INVENTION

A seat belt retractor for a vehicle has a sensor that responds to changes in vehicle acceleration occurring in a crash. There are usually two sensor inertia mechanisms within the seat belt retractor. The webbing sensor detects payout of the webbing from the seat belt retractor due to the movement of a vehicle occupant when the acceleration of the vehicle decreases or increases. The acceleration sensor comprises an inertia mass either in the form of a ball or a hollow shaped tube acting on a pin or an inertia mass with a relatively high center of gravity located above a narrow base. Movement of the inertia mass acts on a lever positioned in close proximity to the inertia mass to move a toothed portion of the lever into engagement with teeth on a spool or a ratchet thus initiating the locking of the retractor spool and preventing further payout of the webbing.

A typical seat belt retractor, including an acceleration sensor, comprises many cooperating components. One of the problems associated with prior art seat belt retractors is that each component can vary in size due to environmental variations such as changes in temperature during the component manufacturing process. For example, components vary in dimensions when made in multi-cavity tools where more than one component is molded in sequence or at the same time. Also, after large volumes of components have been manufactured in a tool, the molding tool may deteriorate or wear causing variation in component sizes. The variation in sizes creates variability in the relationship between each component. This is particularly undesirable in the acceleration sensor as the spacing between the spool teeth and the acceleration sensor locking teeth requires precision. Variation in the gap between the spool or ratchet teeth and the acceleration sensor locking tooth gives poor repeatability of the acceleration sensor performance. The space between the spool or ratchet teeth and the acceleration sensor locking tooth is called the "tip gap".

If the tip gap is too narrow the acceleration sensor lever may engage with the spool teeth and lock the seat belt retractor in a non-emergency situation. This can create discomfort for the occupant with the seat belt "jamming".

Also, if the various seat belt retractor components have changed in size creating a varying "tip gap", and if the vehicle is positioned at an angle the vehicle occupant may not be able to remove the webbing from the seat belt retractor rendering the seat belt unusable or creating a very sensitive belt which acknowledges and locks the seat belt retractor under non-emergency situations.

It is required that all seat belt retractors lock within specific pay out of webbing under certain vehicle acceleration and declaration conditions. With wide variations in component sizes the seat belt retractor locking times will vary and therefore different amounts of webbing will be released from the seat belt retractor. Such variations result in poor performance and efficiency of the seat belt. The higher the variation in the acceleration sensor performance, the higher the likelihood of experiencing high payout of webbing which will not provide the most effective protection to the vehicle occupant during a crash.

According to a first aspect of the invention there is provided a seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the support being arranged to pivot so as to adjust the distance between the pawl and the ratchet.

In that way the position of the pawl can be adjusted to provide an optimum gap between the pawl tip and the ratchet on the spool.

In one embodiment the pawl is arranged to one side of the support and the support is pivotal about a longitudinal axis thereof.

The support preferably comprises a base having a recess and two end walls upstanding from opposite edges of the base, the inertia mass being received in the recess and the pawl being arranged over the inertia mass, pivotally mounted to an upper part of one end wall.

In such a case the support preferably includes respective pivot members extending from each end wall to enable the support to be pivotally mounted to the frame.

According to a second aspect of the invention there is provided a seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the spool having a cam formation with a circular cam periphery arranged substantially coaxially therewith, the support having a cam follower, the support being mounted movably relative to the spool in response to movement of the cam follower.

In that way the position of the pawl tip relative to the ratchet can continually be adjusted in response to, for example, irregularities in the concentricity of the spool.

Preferably, the support is pivotably mounted to the frame so that movement of the cam follower causes the support to pivot so as to effect automatic tip gap adjustment.

According to a third aspect of the invention, there is provided a seat belt retractor comprising a frame, a spool rotably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device,the actuating means comprising a pawl actuating lever pivotally mounted to the support and arranged between the inertia mass and the pawl, the pawl including a cam surface, the pawl actuating lever engaging the cam surface whereby movement of the pawl actuating lever along the cam surface adjusts the distance between the pawl and the ratchet.

In a preferred embodiment of the third aspect, the movement of the pawl actuating lever along the cam surface is effected by means of a movement mechanism comprising a pivot pin which pivotally mounts the pawl actuating lever and a pivot member extending from the pivot pin, parallel with and offset from the axis thereof, and received in the support, whereby rotation of the pivot member effects movement of the pawl actuating lever along the cam surface.

According to a fourth aspect of the invention there is provided a seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the inertia mass engaging the underside of the pawl, the underside of the pawl having a cam surface thereon whereby movement of the inertia mass relative to the pawl along the cam surface effects adjustment of the distance between the pawl and the ratchet.

In a preferred embodiment of the fourth aspect movement of the pawl is effected by a movement mechanism which comprises a pivot pin which pivotally mounts the pawl and a pivot member extending from the pivot pin, parallel with and offset from the axis thereof, and received in the support, whereby rotation of the pivot member effects relative movement of the pawl and inertia mass.

BRIEF DESCRIPTION OF THE DRAWINGS

Seat belt retractors in accordance with the invention will now be described in detail, by way of example, with reference to the accompanying drawings, in which:

FIG. 3 is a side elevation of an acceleration sensor for use in a seat belt retractor in accordance with the second aspect of the invention arranged beneath a ratchet of a retractor spool;

FIG. 4 is an end elevation of the arrangement of FIG. 3;

FIG. 5 is a perspective view of part of the arrangement of FIGS. 3 and 4;

DETAILED DESCRIPTION OF THE INVENTION

Figure 1:
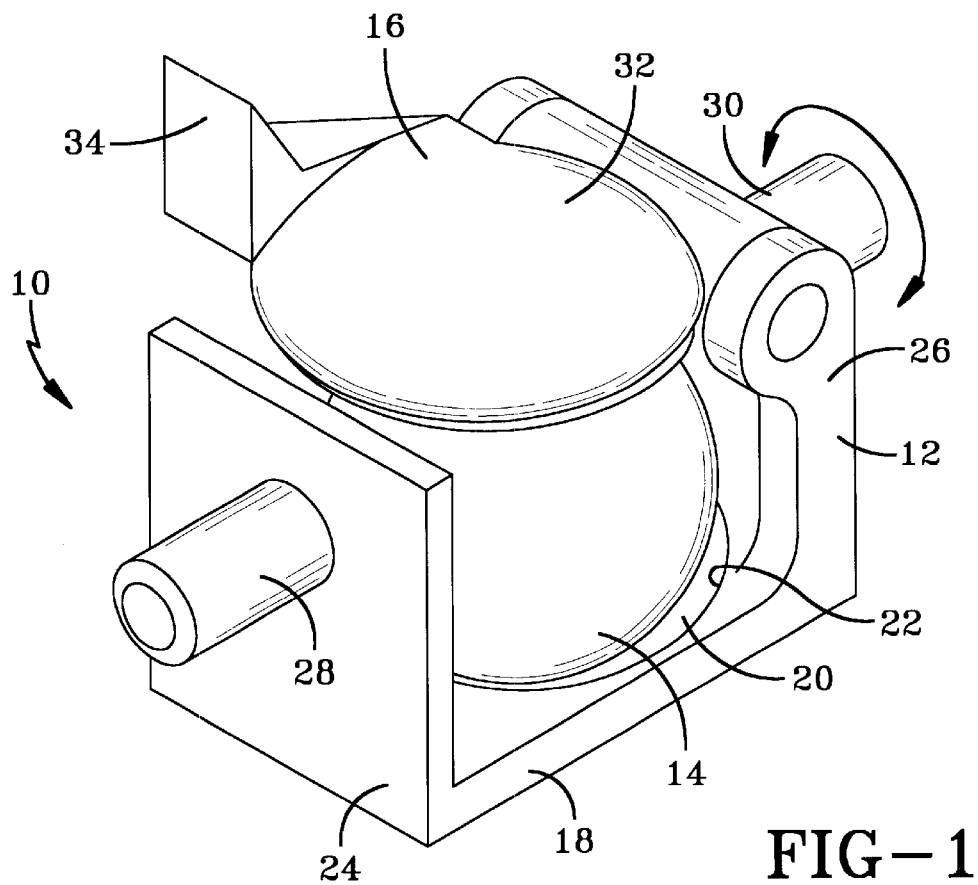
FIG. 1 is a perspective view of an acceleration sensor for use in a seat belt retractor in accordance with the invention.

In FIG. 1 an acceleration sensor 10 for use in a seat belt retractor (not shown) comprises a support 12, a spherical inertia mass 14 arranged on the support 12 and a pawl 16 pivotally mounted to the support 12 and arranged above the inertia mass 14.

The support 12 comprises a base 18 having a substantially circular recess 20 formed therein with sloping side walls 22. The support 12 further comprises end walls 24, 26 that are arranged upstanding from opposite ends of the base 18.

A pivot member, such as a peg or pin 28, extends perpendicularly outwardly from the end wall 24, from the face of the end wall facing away from the other end wall. A pivot member, such as a peg or pin 30, extends perpendicularly outwardly from the end wall 26 from the face of the end wall 26 facing away from the other end wall 24. The pivot members 28, 30 are arranged co-axially with respect to each other.

The inertia mass 14 is arranged in the recess 20. The pawl 16 is pivotally mounted to the upper part of the end wall 26 of the support 12. The pawl comprises a curved cap 32 and a pawl tooth 34 arranged at one side of the cap 32.

The cap 32 is arranged over the spherical inertia mass 14 so as to cover part of the inertia mass and the tooth 34 extends upwardly from said one side of the cap 32 towards a ratchet on a retractor spool (not shown). The function of the acceleration sensor is described in detail above and will not be gone into here. As mentioned above, it is necessary to adjust the gap between the tip of the pawl tooth 34 and the teeth of the ratchet (not shown) after assembly of the sensor into the retractor spool. As used herein and in the claims the term "tip gap" is understood to mean the space between the spool or ratchet teeth and the acceleration sensor locking tooth. In the present embodiment the support 12 of the acceleration sensor 10 is pivotally mounted to the seat belt retractor by means of the pivot members 28, 30. As the pawl tooth 34 is arranged offset from the axis of the pivot members rotation of the support about the pivot members effects up and down movement of the pawl tooth 34. Accordingly, in the present embodiment when the support 12 of the acceleration sensor 10 is arranged in position on the seat belt retractor the support can be pivoted about the axis of the pivot members 28, 30 in order to effect adjustment of the gap between the pawl tooth 34 and the teeth of the ratchet (not shown).

Preferably the pivot members 28, 30 are received with an interference fit in a seat belt retractor so that once adjusted the support 12 does not return to its initial position by means of, for example, vibration of the vehicle in which the seat belt retractor is located. Alternatively, the surface of one or more of the pivot members 28, 30 may be crenellated and a tang may be provided in the recess in which the pivot member is received in the seat belt retractor so that a positive engagement is effected to prevent the support 12 from moving out of position.

Figure 2:
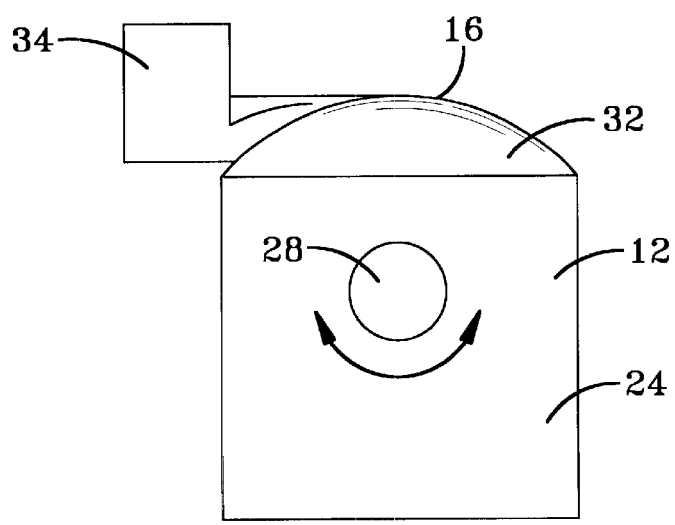
FIG. 2 is an end elevation of the acceleration sensor of FIG. 1.

In FIG. 3, an alternative arrangement of seat belt retractor in accordance with the first and second aspect of the invention is shown. Parts corresponding to parts in FIGS. 1 and 2 carry the same reference numerals. In FIG. 3, the acceleration sensor 10 is arranged in a seat belt retractor (not shown) adjacent a ratchet 36 of the seat belt retractor. The sensor 10 comprises a support 12, an inertia mass 14 and a pawl 16. The support 12 is similar to that shown in FIG. 1 except the end wall 24 is omitted, as are the pivot members 28, 30. Instead, the support includes an extending base part 38 extending from the end wall 26 in a direction away from the inertia mass 14. The extended base part 38 has an upstanding member 40 that is pivotally mounted at pivot point 42 to the seat belt retractor. The upstanding member 40 has a cam follower member 44 extending from an upper part thereof. The cam follower 44 includes a cam follower finger 46 projecting transversely from one end thereof towards a circular cam surface 48 arranged on the ratchet 36. The cam surface is arranged co-axially with the ratchet 36.

A leaf spring 50 is arranged beneath the support 12 engaging the underside of the base 18 so as to bias the support towards the ratchet 36.

In the embodiment of FIGS. 3 to 5 the support 12 is adjusted initially on assembly by rotating the support about the pivot point 42 so as to correct the gap between the tip of the pawl tooth 34 and the teeth of the ratchet 36. During operation of the seat belt retractor, errors in the concentricity of the axis of the ratchet may produce variations in the gap between the pawl tooth and the teeth of the ratchet. In the present embodiment that gap is corrected automatically by means of the cam follower 44. The finger 46 of the cam follower 44 follows the circular cam surface 48 that is arranged co-axially with the ratchet 36. Thus, any vertical movement of the ratchet due to manufacturing errors for example, will result in a corresponding movement of the support 12 about the axis 42. If the ratchet 36 moves upwardly in FIG. 3 the leaf spring 50 will bias the support 12 upwardly by corresponding distance. If the ratchet 36 moves downwardly the cam surface 48 will act against the cam follower 44 so as to push the support 12 downwardly against the bias of the spring 50.

Figure 6A:
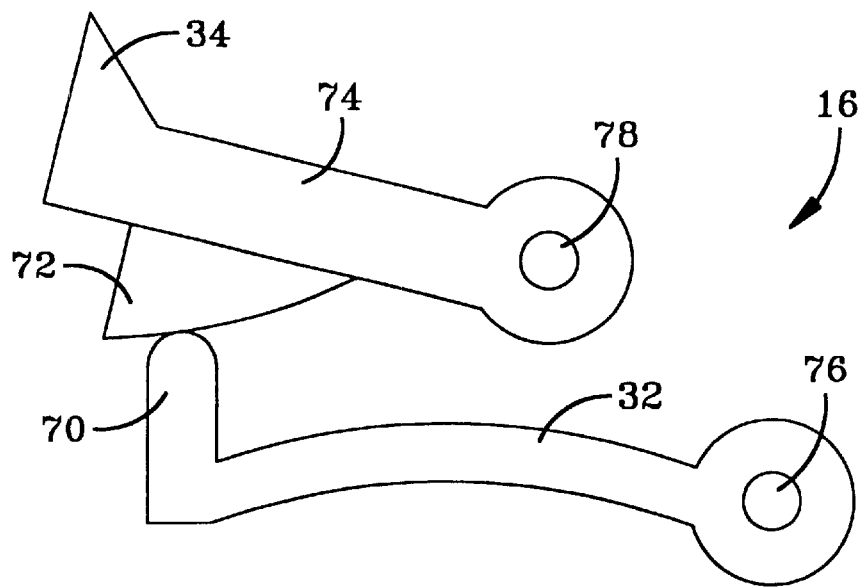
FIGS. 6A–B is are diagrammatic side elevation of a pawl and pawl actuating lever of an acceleration sensor in a seat belt retractor in accordance with the third aspect of the invention showing the method of adjusting the pawl.
Figure 6B:
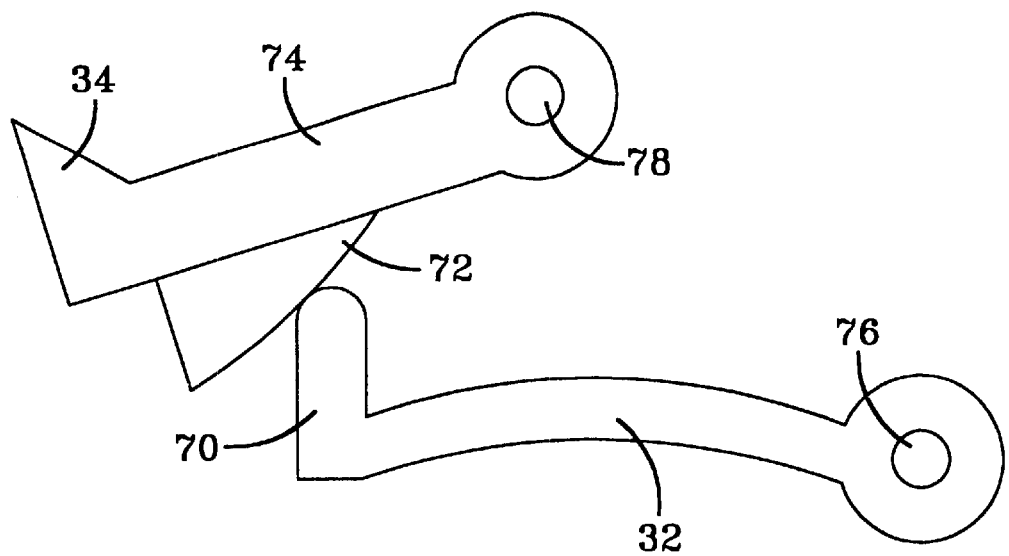

In FIGS. 6A–B the operation of the pawl and pawl actuating lever from the third aspect of the invention is illustrated. In FIGS. 6A–B the pawl 16 is formed in two parts. The cap 32 which extends over the inertia mass 14 has a pawl actuating tip 70 which engages a ramped surface 72 on the underside of a pawl 74. The cap 32 is pivotally mounted at pivot point 76 to the support 12 and the pawl is pivotally mounted at pivot point 78 to the seat belt retractor. The pawl 74 farther includes a pawl tooth 34, similar to that shown in previous embodiments.

In use, movement of the inertia mass 14 out of the recess 20 in the base 18 of the support 12 actuates the cap 32 upwardly which, pivots about pivot point 76 and pushes the pawl 74 upwardly by means of the pawl actuating tip 70 so that the pawl tooth 34 can engage with the teeth of the ratchet 36 (not shown). The pawl actuating tip 70 engages the ramped surface 72 on the underside of the pawl 74 so that relative lateral movement between the pawl and the cap 32 alters the initial position of the pawl tooth 34 as shown in FIG. 6B. In FIG. 6A the pawl actuating tip 70 contacts the ramped surface 72 towards the left hand end thereof. The ramp 72 tapers outwardly from its right hand end to its left hand end so that engaging the pawl tip 70 with the left hand end of the ramp will mean that the pawl tip 34 is pushed upwardly.

If the pawl is moved laterally relative to the cap 32 as shown in FIG. 6B the pawl actuating tip 70 engages the ramped surface 72 towards a right hand end thereof which means that the pawl tip 34 will be moved away from the ratchet 36 and will be arranged lower relative to the ratchet than when the pawl actuating tip 17 engages the left hand end of the ramped surface 72. Thus relative lateral movement between the pawl 74 and the cap 36 will result in adjustment of the initial position of the pawl tooth 34 and thus adjustment of the size of the gap between the tooth and the teeth of the ratchet 36. Although FIG. 6B shows the pawl moving and the cap remaining stationary it will be appreciated that the pawl could be held fixed and the cap moved relative to it. Indeed that latter arrangement is preferred.

Figure 7:
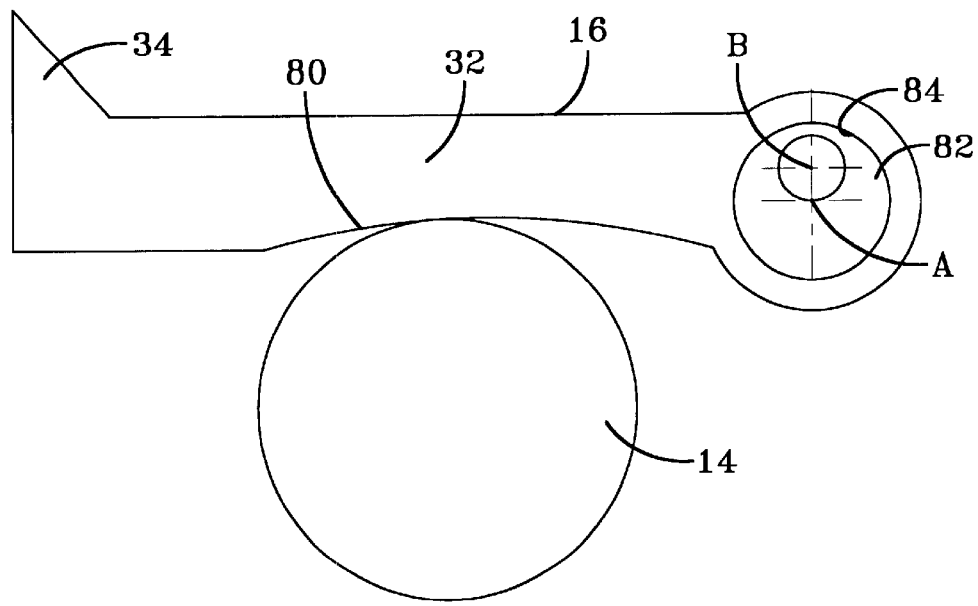
FIG. 7 is a side elevation of part of the acceleration sensor for use in the seat belt retractor in accordance with the fourth aspect of the invention; and, FIG. 8 is a perspective view of the pawl adjusting mechanism of the sensor of FIG. 7.
Figure 8:
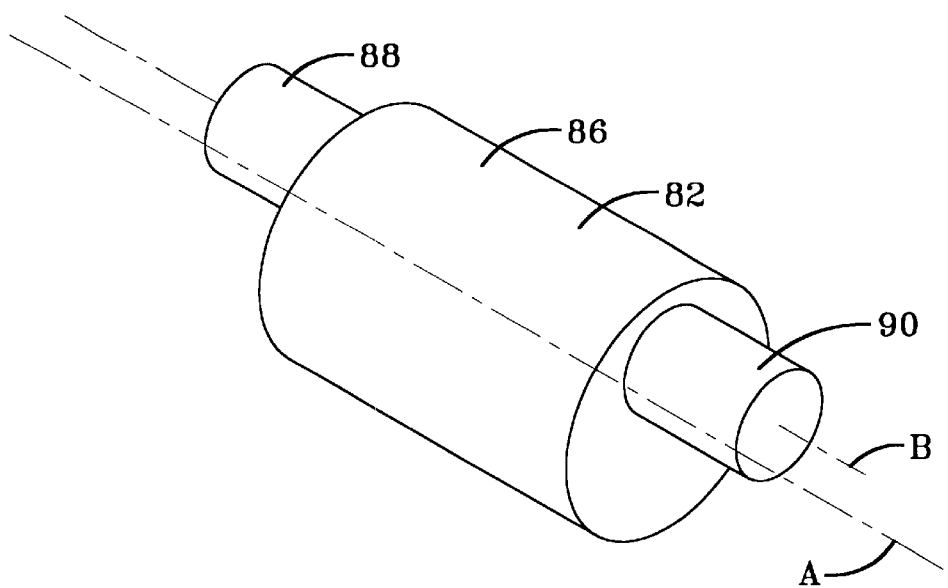

In FIG. 7 part of the acceleration sensor for use in a seat belt retractor in accordance with the fourth aspect of the invention is illustrated. The sensor 10 is substantially similar to that illustrated in FIG. 1 and parts corresponding to parts in FIGS. 1 and 2 carry the same reference numerals. In FIG. 7 the majority of the sensor 10 is omitted for clarity and the main part of interest is the pawl 16 and its relation to the inertia mass 14.

In FIG. 7 the pawl 16 comprises a cap 32 and a pawl tooth 34. The cap has a ramped portion 80 on the lower surface thereof which rests upon the inertia mass 14. Thus movement of the pawl 16 relative to the inertia mass 14 will result in a change in the position of the pawl tooth 34 relative to the teeth of the ratchet 36. In the present embodiment, the pawl can pivot about an axis A defined by a shaft 82 that extends through a bore 84 in the pawl 16. The shaft comprises a cylindrical body 86 with pivot members, such as pegs or pins 88, 90 extending from opposite ends of the body 86, offset from the axis A. The pivot members 88, 90 are co-axial on an axis B. The pivot members are received in apertures formed in the upper part of the end wall 26 of the support 12 (not shown). Thus, rotation of the pivot members 88, 90 about the axis B will cause the cylindrical body 86 to rotate about the axis B. As axis B is offset from the center of the cylindrical body 86 the rotation will tend to move the pawl 16 from side to side. In that way the lateral position of the pawl 16 can be altered so that the inertia mass 14 engages the ramped surface 80 on the underside of the pawl at different points so as to effect adjustment of the initial position of the pawl tooth 34 relative to the ratchet 36.

Although the above described embodiments illustrate separate aspects of the invention it will be appreciated that two or more of the aspects may be combined in a single sensor in order to provide various means of adjustment of the pawl tooth. For example, the first aspect of the invention provides a method whereby the initial position of the pawl tooth can be altered over quite large distances whereas the fourth aspect of the invention provides a method of altering the initial position of the pawl tooth over smaller distances. Combination of the two systems can be provide a method whereby initial adjustment is effected over a large distance and then a finer final adjustment is made using the fourth aspect arrangement. Additionally, the arrangement set out in the second aspect of the invention may be incorporated so as to allow continual adjustment of the pawl tooth gap during operation of the seat belt retractor.

Many changes and modifications in the above described embodiments of the invention can, of course, be carried out without departing from the scope thereof. Accordingly, that scope is intended to be limited only by the scope of the appended claims.

We claim:

1. A seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, and two pivot members arranged co-axially with respect to each other, each pivot member extending perpendicularly outward from an end wall of the support, the support being arranged to pivot around the axis passing through the two pivot members so as to adjust the distance between the pawl and the ratchet.

2. The seat belt retractor according to claim 1 wherein the pawl is arranged to one side of the support.

3. The seat belt retractor according to claim 2 wherein the support comprises a base having a recess, the inertia mass being received in the recess and the pawl being arranged over the inertia mass, the pawl pivotally mounted to an upper part of one end wall.

4. The seat belt retractor according to claim 3 wherein the pivot members enable the support to be pivotally mounted to the frame.

5. A seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the spool having a cam formation with a circular cam periphery arranged substantially coaxially therewith, the support having a cam follower, the support being mounted movably relative to the spool in response to movement of the cam follower.

6. The seat belt retractor according to claim 5 in which the support is pivotably mounted to the frame so that movement of the cam follower causes the support to pivot so as to effect automatic tip gap adjustment.

7. A seat belt retractor comprising a frame, a spool rotably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the actuating means comprising a pawl actuating lever pivotally mounted to the support and arranged between the inertia mass and the pawl, the pawl including a cam surface, the pawl actuating lever along the cam surface adjusts the distance between the pawl and the ratchet.

8. The seat belt retractor according to claim 7 wherein the movement of the pawl actuating lever along the cam surface is effected by means of a movement mechanism comprising a pivot pin which pivotally mounts the pawl actuating lever and a pivot member extending from the pivot pin, parallel with and offset from an axis thereof, and received in the support, whereby rotation of the pivot member effects movement of the pawl actuating lever along the cam surface.

9. A seat belt retractor comprising a frame, a spool rotatably mounted to the frame, a spool locking device for locking the spool to prevent rotation thereof, actuating means for actuating the spool locking device comprising a support carrying an inertia mass and a pawl, the inertia mass being arranged to move from an initial position to an actuating position to actuate the pawl into engagement with a ratchet on the spool whereby engagement of the pawl with the ratchet actuates the spool locking device, the inertia mass engaging the underside of the pawl, the underside of the pawl having a cam surface thereon whereby movement of the inertia mass relative to the pawl along the cam surface effects adjustment of the distance between the pawl and the ratchet; movement of the pawl is effected by a movement mechanism which comprises a pivot pin which pivotally mounts the pawl and a pivot member extending from the pivot pin, parallel with and offset from an axis thereof, and received in the support, whereby rotation of the pivot member effects relative movement of the pawl and inertia mass.

* * * * *